United States Patent [19]

Abelitis

[11] 4,211,573
[45] Jul. 8, 1980

[54] METHOD AND APPARATUS FOR THE PRODUCTION OF CEMENT CLINKER LOW IN ALKALI FROM ALKALI-CONTAINING RAW MATERIAL

[75] Inventor: Andris Abelitis, Rösrath, Fed. Rep. of Germany

[73] Assignee: Klockner-Humboldt-Deutz Aktiengesellschaft, Fed. Rep. of Germany

[21] Appl. No.: 888,757

[22] Filed: Mar. 21, 1978

[30] Foreign Application Priority Data

Mar. 21, 1977 [DE] Fed. Rep. of Germany ....... 2712239

[51] Int. Cl.² .............................................. C04B 7/02
[52] U.S. Cl. .................................................... 106/100
[58] Field of Search ................ 106/100, 101, 102, 103

[56] References Cited

U.S. PATENT DOCUMENTS

3,923,536  12/1975  Kobayashi .......................... 106/100

*Primary Examiner*—James Poer
*Attorney, Agent, or Firm*—Hill, Van Santen, Steadman, Chiara & Simpson

[57] ABSTRACT

A method for the production of low alkali-cement clinker from alkali-containing raw material comprising a preheating step, a deacidification step and a sintering step utilizes a portion of the alkali-containing exhaust gases from the sintering step which are mixed with deacidified combustion gases from the deacidification step and reintroduced into the system in contact with the raw material to preheat and precalcity the raw material in a plurality of cyclones.

5 Claims, 1 Drawing Figure

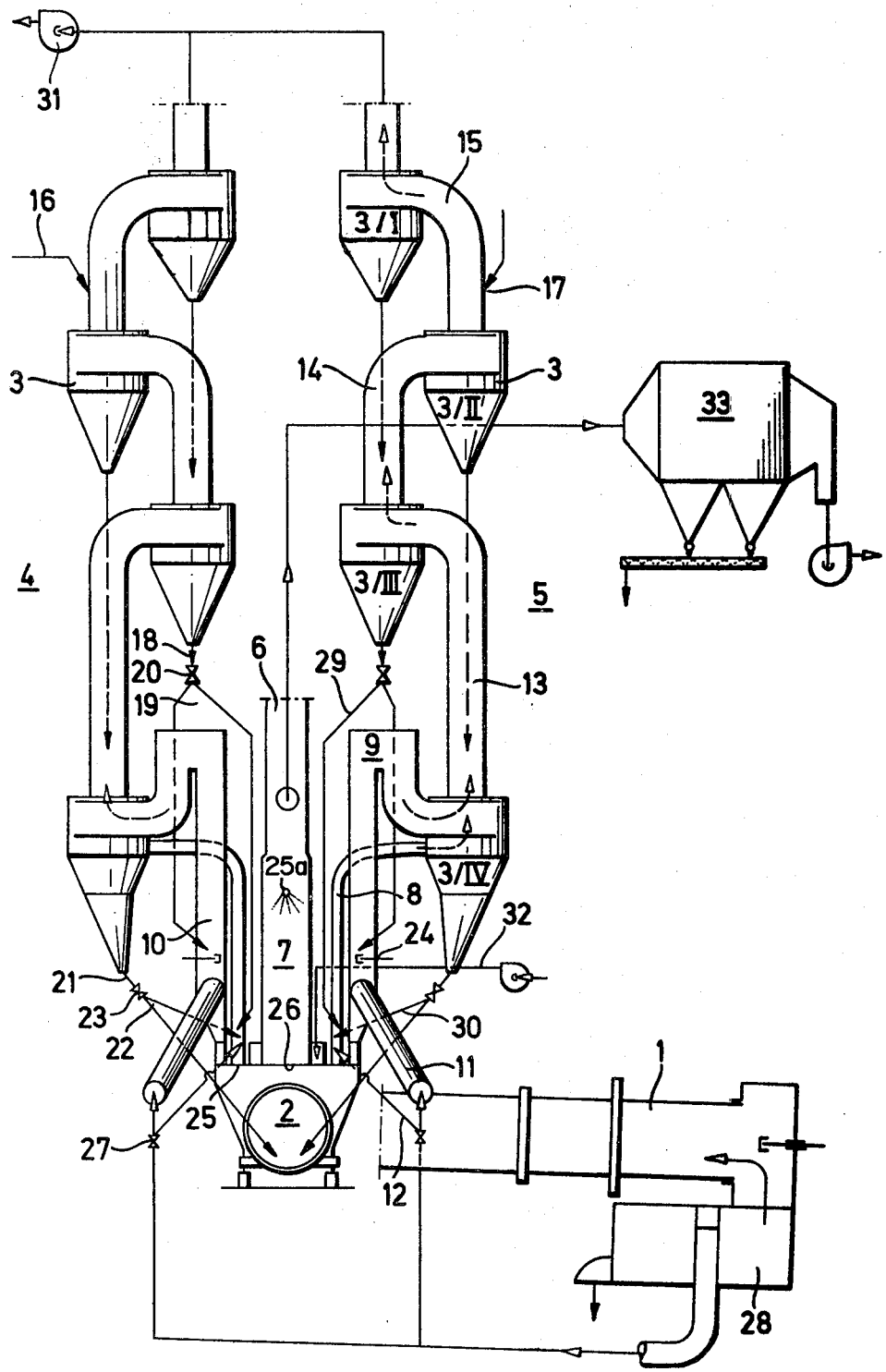

METHOD AND APPARATUS FOR THE PRODUCTION OF CEMENT CLINKER LOW IN ALKALI FROM ALKALI-CONTAINING RAW MATERIAL

BACKGROUND OF THE INVENTION

The invention relates to a method for the production of cement clinkers low in alkali from alkali-containing raw material, whereby the latter is thermally treated in a multiple, step calcination process, preferably consisting of a pre-heating step, a deacidification step, a sintering step and a cooling step, and whereby fuel of any type is introduced both in the deacidification step as well as also in the sintering step, and hot air of the cooling step is supplied both to the calcination step as well as also to the sintering step as combustion air. The invention relates also to an apparatus for carrying out the method.

It is known that alkali-compounds in cement may appreciably shorten the solidification time and carry out the so-called change-over of the cement. Furthermore, it is known that too high an alkali-content in the cement may lead to blistering of alkali-sulfates in the concrete. Also, with the so-called additive substances capable of reaction, through a high alkali-content in the cement, a reaction of the alkalies with these additive substances may cause an alkali-expansion of the cement and thereupon endanger the constancy of volume of the concrete. Upon burning of cement clinkers, out of alkali-containing raw material, the alkalies, particularly the alkali-chlorides are volatilized quantitatively in the combustion furnace and reach with the exhaust gas of the combustion furnace into the preheater whereby they deposit themselves on the raw material and are conveyed back again in circulation with the pre-heated raw material into the combustion furnace. In this way, result the alkali-circulations in the stream of material and stream of gas, known to every expert, which lead to high increases in alkali and to cakings or deposits of alkali-compounds in the system of the calcination installation.

For the prevention of these disadvantages, it is known to burn the cement clinkers in two steps. According to earlier suggestions, the alkali-containing exhaust gases of the combustion furnace—sintering step—are conveyed off from the total calcination process, so that no alkalies may condense on the colder raw material. In this manner, no highly increasing circulation of harmful material can build up in the system. This method has, however, the extraordinarily great disadvantage that the sintering step in each case is lost without utilization of the combustion process, whereby the production costs of the cement are increased up to complete lack of economy.

In more recent times, for the production of cement clinkers low in alkali, from alkali-containing raw material, a method has become known (German Laid-Out Specification No. 22 62 213) in which a part of the exhaust gases of the sintering step is continuously removed through a bypass from the combustion process and the other part of the furnace exhaust gases is used for the raw material drying. For the pre-heating and calcination of the raw material, hot cooler-exhaust-air is used, in which additional fuel is burned, whereby the exhaust gases of the calcination step are used for the preheating of the raw material in the preheating step. The higher the alkali-content in the furnace exhaust gases, the higher is also the portion of the furnace gases which are discarded directly out of the system. In the case of less alkali-containing furnace exhaust gases, indeed a greater part of the exhaust gases are used for the raw material drying, however, in this connection, thermally high-valent furnace exhaust gases must indeed be directly discarded. This method can accordingly in no manner satisfy in respect of an economical heat-use of the combustion process. Besides, this method is unsuitable upon the treatment of raw material with greatly fluctuating and timewise very high alkali-content.

SUMMARY OF THE INVENTION

It is the object of the invention to overcome the disadvantages portrayed and to improve a method for the thermal treatment of particularly alkali-chloride-containing raw material to be used in the manufacture of cement, to the extent that also a raw material to be used in the manufacture of cement with a greatly fluctuating and timewise very high alkali-content may be treated with the lowest possible heat losses and without the danger of alkali-circulations, with low investment costs. Furthermore, the object lies therein, namely without disadvantageous interventions in the calcination process, to adjust exactly the alkali-content in the cement clinkers to predetermined values permissible in each case, and in this manner even with the most cumbersome conditions on the raw-material side produce a so-called—"low-alkali"—cement.

This object is solved according to the invention thereby, that at least a part of the alkali-containing exhaust gases directly from the sintering step is mixed with the combustion gases from the deacidification step, in the pre-heating step, and the mixing gas hereupon serves for the precalcination and/or pre-heating of the raw material, and that the other part of the alkali-containing exhaust gases of the sintering step is removed in a manner known per se from the calcination process. In this manner, it is possible that in spite of changeably high alkali-contents in the raw material to be used in the manufacture of cement, the heat content of a part of the alkali-containing furnace exhaust gases may be made use of for the preheating of the raw material, and in spite of this, a cement clinker with low alkali-content may be calcined. The heat losses previously taken into consideration upon the calcining of cement clinker loss in alkali-content, from particularly high-alkali-containing raw material to be used in the manufacture of cement, are in this manner now quite appreciably limited. Thus, a best-possible utilization of fuel is insured. It is suitable in this connection to intermix the exhaust gases from the sintering step and the combustion gases from the deacidification step at the same temperature level, preferably at 800°–1000° C.

In development of the invention, it is provided that the partial quantity of exhaust gas of the sintering step is conveyed to the preheating step and before entry into the preheating step is cooled by mixing with a partial quantity of the raw material which has been preheated to the temperature level of the combustion gases from the deacidification step. In this manner, a partial quantity of the raw material in the hot stream of exhaust gas, on account of the high temperature-difference between gas and particles of comminuted raw material, is intensively deacidified, because the $CO_2$ is driven to a fargoing extent rapidly and almost without resistance out of the particles of comminuted raw material to be used in the manufacture of cement. During the deacidification, on account of the endothermic process, heat is used, so that through a predetermined partial quantity of comminuted raw material, the hot partial quantity of exhaust gas obtained may be adjusted to the temperature-level of the combustion gases from the deacidification. It is, however, also possible instead of the preheated raw material, to use a partial quantity of raw material from the deacidification step, already calcined to a fargoing extent, for the cooling of the gas. This may particularly take place then when only a small partial quantity of exhaust gas may be utilized for the thermal treatment, and the other partial quantity on account of the high alkali-content in the exhaust gases must be discarded. The low quantity of heat required for the complete deacidification of the particles of raw material already deacidified to a fargoing extent is then withdrawn from these hot exhaust gases of the sintering step.

In a further development of the invention, it is provided that to the partial quantity of exhaust gas conveyed for use in the preheating step, preferably is conveyed hot exhaust air of the cooling step as carrier medium. This measure is of advantage particularly then when only a very small partial quantity of the alkali-containing gases from the sintering step can be utilized for the thermal treatment of the raw material, and in such case, the danger exists that the raw materials used for the cooling of the exhaust gases are not dragged along by the stream of gas, but under certain circumstances, drop directly into the sintering step. In order to prevent this, air and preferably the hot exhaust air of the cooling step is used as carrier medium, so that the raw materials used for the cooling of the hot exhaust gases of the sintering step are reliably taken along by the gases. There may be taken internally with the same result, hot air, hot gases from the preheating step or purified bypass-gases.

In preferred development of the invention, it is provided that the alkali-containing partial quantity of exhaust air of the sintering step is conveyed in several preheating steps arranged preferably parallel to one another, so that the method permits also of introduction with advantage in an installation with very high output yield. It is suitable in this connection, that in the case where about 50% of the alkali-containing exhaust gases of the sintering step are removed from the combustion process, the remaining partial quantity of exhaust gas is conveyed exclusively in one of the two preheating steps present, and is there mixed with the combustion gases from the combustion step. In this manner, even with two preheating steps arranged parallel with one another, the one line is acted on fully with the hot exhaust gases of the sintering step, while the other preheating step, referred to the sintering step, is completely cut off on the gas-side. This has the advantage of the better thermal utilization of the hot exhaust gases of the sintering step.

The invention relates also to an apparatus for carrying out the method, and is characterized by at least one cyclone-preheater operating according to the suspension-gas-principle with calcination device which is connected in series with a rotary kiln, with which on its part is connected in series a material cooler, whereby the rotary kiln and the calcination device are in connection on the hot gas side with the material cooler, whereby furthermore, the rotary kiln is connected through at least one bypass conduit with the atmosphere and through at least one exhaust gas conduit during bypassing of the calcination device, with the cyclone-preheater. In this manner, with constructively simple means, a cement-production-installation is set up, with which it is possible also to treat a raw material to be used in the manufacture of cement with greatly fluctuating or high-alkali-containing starting material, respectively, and at the same time to lower quite appreciably the heat losses per kilogram of burnt cement clinker.

With a production installation developed constructively in such a manner, it is possible for the first time to treat cumbersome starting materials in economical manner and with optimal utilization of the fuel-heat. It is suitable in this connection that the exhaust gas conduit from the rotary kiln together with the gas conduit from the calcination device is connected directly with the lowermost cyclone of the cyclone-heater. Particularly then when the gas conduit from the calcination device discharges above the exhaust gas conduit in the cylindrical part of the lowermost cyclone, the raw material separated off in this cyclone from the gas stream of the calcination device subsequently comes into contact with the hot exhaust gases of the sintering step, so that there a certain post-calcination is attained. It is, however, principally also possible to guide the exhaust gas conduit from the sintering step into the conical part of the lowermost cyclone or into its discharge tip.

In development of the invention, it is provided that in the exhaust gas conduit from the sintering step, a branch conduit is conveyed for preheated and/or calcinated raw material, so that in this manner a cooling of the hot exhaust gases from the sintering step may take place through the raw material itself.

In further development of the invention, it is provided that in the exhaust gas conduit preferably in the area of the discharge from the rotary kiln, an air conduit is conveyed, suitably an air conduit which connects the material cooler and the exhaust gas conduit with one another or discharges from the connecting conduit, respectively, between calcination device and material cooler, and is guided in the exhaust gas conduit from the otary kiln. In this way, hot carrier-air may reach into the exhaust gas conduit, in case with a high bypass-guidance of the alkali-containing exhaust gases, for example, above 85%, the remaining alkali-containing exhaust gases, on account of the determined cross-sectional conditions of the exhaust-gas conduit are not in position to drag along the raw material introduced into this exhaust-gas conduit for the separation in the lowermost cyclone of the preheater.

For the accurate adjustability of the partial quantity of raw material introduced into the exhaust gas conduit, in dependence on the partial quantity of furnace-exhaust-gas, there is arranged in the material-offtake of the lowermost cyclone of the preheater, a divided conduit with an adjustable distributor member, so that it is also possible to adjust the quantity of material both with the calcination device as well as to the exhaust gas conduit from the rotary kiln. Thus, care is taken that the temperature of the combustion gas from the calcination device and the temperature of the exhaust gases from the rotary kiln at the entry into the lowermost cyclone of the preheater have approximately the same temperatures, so that the entire quantity of the hot exhaust gases at uniformly high temperature level may serve for the preheating of the raw materials.

Countless further features of the invention will be explained in greater detail in the following on the basis of the description of an embodiment by way of example for an installation for the thermal treatment of alkali-containing raw material to be used in the manufacture of cement.

THE DRAWING

The drawing shows a diagrammatic disclosure of a cement production installation with two suspension gas preheaters arranged in parallel each consisting of several cyclones.

PREFERRED EMBODIMENTS

The partial view shown in the drawing illustrates an installation with a rotary kiln 1, furnace-inlet-head 2 and two parallel suspension gas preheaters 4, 5 arranged parallel with one another, each consisting of several cyclones 3 in series. A bypass 6 is connected with a furnace-inlet-head 2 and is provided with a chamber 7 for the cooling of the alkali-containing exhaust gases with cold air or water or both, and is connected to an electro-dust-removal installation for discharge to the atmosphere.

On both sides of the bypass conduit 6 are arranged the cyclone-preheaters 4 and 5. The furnace-inlet-head 2 is in connection through the exhaust gas conduit 8 with the lowermost cyclone 3/IV of the preheater. In this cyclone is besides guided the gas conduit 9 of the calcination device 10, which on its part is in connection through the hot air conduit 11 with a sinter-material cooler 28 for the raw material for cement burnt to completion in the rotary kiln, is constructed as reaction-line or-section, and has a calcination device 24. The exhaust gas conduit 8 and the gas conduit 9 are guided in common in the cylindrical part of the lowermost cyclone 3/IV, whereby the gas conduit 9 is arranged above the exhaust gas conduit 8. The exhaust gas conduit 8 is also in connection with the hot air conduit 11 through a branch-air-conduit 12. The cyclones 3 of one of each cyclone-preheaters 4, 5 are connected with one another by means of gas conduits 13, 14, 15 in such a manner that the hot mixing-gases from the lowermost cyclone 3/IV are guided by means of a blower 31 consecutively through the individual cyclones of the preheater.

On the material side, the cyclones 3 of the cyclone-preheaters 4,5 are so connected with one another that the raw material to be used in the manufacture of cement delivered to the preheaters in each case in the upper area at 16, 17, in counter current to the rising hot gases, passes through the cyclones 3 from above downwardly in known manner. After the third cyclone 3/III in each case, viewed in direction of the material passage, its material discharge 18 is divided at 19 with a distributor member 20 and a branch conduit 29 connected to the exhaust gas conduit 8. In the material discharge 21 which leads from the lowermost cyclone 3/IV to the furnace inlet head 2 of the rotary kiln 1, a division 22 is also arranged, in which similarly an adjustable distributor member 23 is inserted, whereby the division 22 is in connection with the lower area of the exhaust gas conduit 8 through the branch conduit 30.

The modus operandi of the installation shown is the following:

The cold raw material to be used in the manufacture of cement supplied to the cyclone preheaters 4, 5 in the upper area at 16, 17 passes through the cyclones from above downwardly in counter-current to the hot gases from the rotary kiln 1 and the calcination device 10 which are intermixed with one another in the lowermost cyclone 3/IV of the particular cyclone-preheater. A part, preferably the larger part of the heated raw material withdrawn from the cyclone 3/III and already preheated to a fargoing extent is delivered to the calcination device 10 and there almost completely deacidified in the hot combustion gases which are produced by means of combustion or burning of the fuels introduced through the combustion device 24 into the hot cooler-exhaust air. The other part of the preheated raw material is conveyed through the bifurcation 19 and the branch conduit 29 into the lower area of the exhaust gas conduit 8 and there into the hot alkali-containing stream of exhaust gas of the rotary kiln, occurring at approximately 1,200° to 1,400° C. Both partial streams of raw material absorb heat during the endothermic progress of the deacidification, so that the temperature of the hot gases from the calcination device or from the rotary kiln, respectively, lie upon entry into the lowermost cyclone at approximately 800° to 1,000° C., and both streams of hot gas upon entry into the lowermost cyclone of the particular cyclone-preheater, have equally high temperature level. The mixing gases serve then for the preheating of the raw material in the upper cyclone-steps of the heat exchanger.

The raw material calcined to a fargoing extent is separated off in the lowermost cyclone from the mixing gas and introduced through the material discharge 21 for the subsequent sintering in the rotary kiln 1. Through the distributor member 23 arranged in the bifurcation 22, an exactly determined partial quantity of this calcined material is delivered through the branch conduit 30 into the lower area of the exhaust gas conduit 8 so that also hereby, the furnace exhaust gases are so cooled, that at the entry into the lowermost cyclone 3/IV, a gas temperature between 800°–1,000° C. is adjusted.

If only a small partial quantity of the alkali-containing furnace exhaust gases is introduced into the exhaust gas conduit, which no longer is in position to distribute into the gas stream the partial quantity of raw material delivered to the exhaust gas conduit for the gas-cooling and take it along to the lowermost cyclone, then through the branch-air-conduit 12, hot exhaust air is supplied from the material cooler, so that the gas-velocity lies so high that reliably the raw material from the gas conduit is taken along in the lowermost cyclone 3/IV of the preheater. The quantity of gas of the alkali-containing exhaust gases from the rotary kiln to be discarded in each case is shortly after the exit from the furnace-inlet-head in the lower area of the bypass 6, chilled by means of a cold stream of air 32 introduced in torsion into the cooling device 7, and if need be, chilled additionally through a spray-device 25a with water, so that reliably all alkalies in the gas stream sublimate and may be separated as dust-fine particles in the electro-separater 33, not shown in greater detail. The locking members 25, 26, 27, of known type of construction arranged separately in each case in the exhaust gas conduit 8, the bypass conduit 6 and the branch air conduit 12, make possible, each according to selected and mutually interlocked adjustment, a 0–100 percent bypass. Some characteristic operational conditions are described in the following.

With a 100% bypass for the alkali-containing furnace exhaust gases, the exhaust-gas-conduit 8 on the furnace-inlet-head 2 is closed by means of the locking member 25. With a 0% bypass, all of the furnace exhaust gases are conveyed through the exhaust gas conduit 8 into the lowermost heat-exchanger-cyclone 3/IV, whereby by means of the distributor members 20 and 23 the quantity of material guided into the exhaust gas-conduit 8 is so adjusted that the furnace-gas-temperature at the cyclone-inlet amounts to between 800° C. and 1,000° C.

With an operational condition lying between 0 and 100% bypass, only a corresponding portion of the furnace-exhaust-gases is conveyed through the exhaust-gas-conduit 8 in the lowermost heat-exchanges-cyclone 3/IV, whereby then apart from this quantity of exhaust gas, the partial quantity of raw material introduced or sent back respectively, into the exhaust-gas-conduit 8 is so adjusted that the exhaust gas temperature at the inlet into the lowermost cyclone again amounts to between 800° and 1,000° C. Particularly with a bypass of the alkali-containing furnace exhaust gases above 85%, the locking member 27 in the branch air conduit 12 is opened, so that hot cooler-exhaust-air can enter into the exhaust gas conduit as carrier medium.

With a 50% furnace bypass, the other half of the alkali-containing furnace-exhaust-gases is conveyed exclusively through an exhaust gas conduit 8 into the lowermost heat, exchanges-cyclone 3/IV in each case, of a preheater. In the case of the two-line-heat-exchanger shown, only the one heat exchanger or the one exhaust-gas-conduit, respectively, is acted on with half of the furnace-exhaust-gases, and thereupon run as 0% bypass, while the other heat exchanger is completely shifted off through the locking members 25 of the furnace-exhaust-gas and this line is driven or operated as at 100% bypass.

The invention is not limited solely to the embodiment shown by way of example, but permits with the lowest investment costs and the lowest heat losses of the heat-content of the alkali-containing furnace-exhaust-gases, of also being utilized in an installation which is laid out for lower output-yields, and contains for example only one heat, exchanger-line. Even so, the cyclone-heat-exchanger may be guided otherwise than shown. It lies also within the scope of the invention to guide the exhaust-gas-conduit out of the rotary kiln to a desired point in the lowermost cyclone of the preheater. Even so, it is with the same success possible to guide the exhaust gas conduit while bypassing the lowermost cyclone directly into the exhaust-gas-conduit of this cyclone.

I claim as my invention:

1. A method for the production of low alkali-cement clinker in a kiln from alkali-containing raw material comprising the steps:

pre-heating said raw material before introducing the material into the kiln;

de-acidifying said raw material prior to introduction into said kiln, and thereby producing deacidified combustion gases;

introducing the pre-heated, deacidified material into a kiln and sintering the material therein, thereby producing hot alkali-containing exhaust gases;

cooling a pre-determined portion of said hot alkali-containing gases from said sintering steps by mixing the pre-determined portion with a quantity of said pre-heated raw material bringing the temperature level of the gases from the sintering step to the temperature level of the gases from the deacidification step;

mixing the predetermined portion of the cooled alkali-containing gases with the combustion gases from the deacidification step and using the mixture for heating and calcining the material in the pre-heating step; and removing the remaining portion of the alkali-containing gases from said sintering step for disposal.

2. A method for the production of low alkali-cement clinker from alkali-containing material in accordance with the steps of claim 1, including the additional step of introducing a pre-determined portion of the deacidification step output into said cooling step so that the material used to cool the exhaust gases is already pre-calcined to a substantial extent.

3. A method for the production of low alkali-cement clinker from alkali-containing material in accordance with the steps of claim 1, including the additional steps of cooling and purifying the remaining portion of alkali-containing gases which are not used in the pre-heating steps before disposing of same.

4. A method for the production of low alkali-cement clinker from alkali-containing material in accordance with the steps of claim 1, including the additional step of introducing said pre-determined portion of alkali-containing gases from the sintering step a plurality of devices for undertaking the pre-heating step which are arranged parallel to each other.

5. A method for the production of low alkali-cement clinker from alkali-containing material in accordance with the steps of claim 1, wherein said pre-determined portion of hot alkali-containing gases is on the order of 50% of the total exhaust gases from the sintering step and the alkali-containing gases utilized are conveyed exclusively for use in said pre-heating step and there mixed with the calcination gases from said deacidification step.

* * * * *